UNITED STATES PATENT OFFICE.

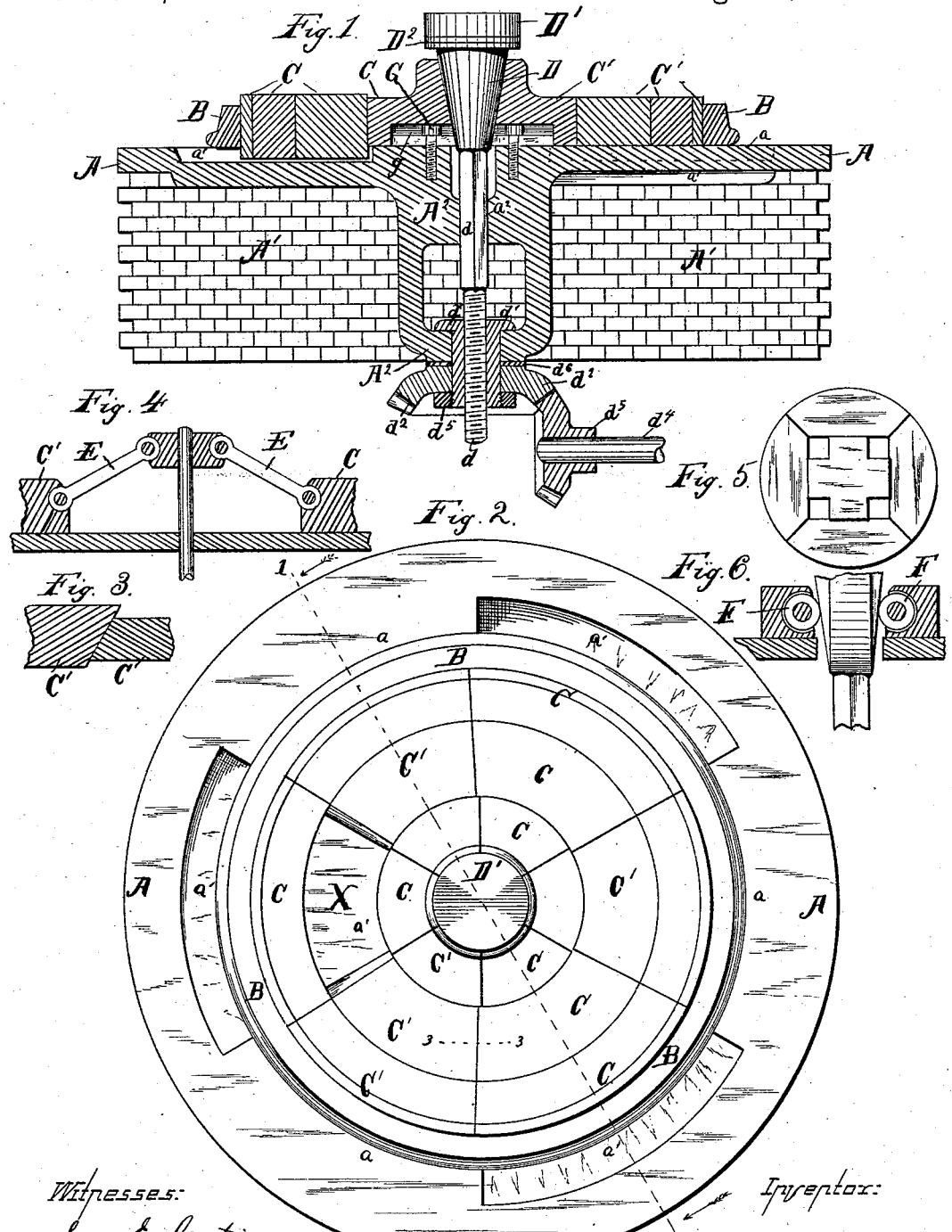

JAMES MUNTON, OF MAYWOOD, ILLINOIS.

TIRE-EXPANDING MACHINE.

SPECIFICATION forming part of Letters Patent No. 324,406, dated August 18, 1885.

Application filed July 23, 1884. (No model.)

*To all whom it may concern:*

Be it known that I, JAMES MUNTON, a citizen of Great Britain, residing in Maywood, in the county of Cook and State of Illinois, have invented a new and useful Improvement in Processes of and Apparatus for Manufacturing Tires, of which the following is a specification.

This invention relates to the manufacture of tires for cars and locomotives.

The object of the present invention is to produce the tire of the required exterior and interior diameter without the necessity of either turning or boring them, which not only occasions loss of labor and metal, but also materially diminishes the durability of the tire, as the hard surface left upon the tread of the tire by the rolls is of course removed by turning. To accomplish this end, I first roll the bloom into a tire of as nearly as possible the desired size, keeping the edges and corners of the tire at the same time perfectly smooth, either by preventing the formation of fins or else by removing them as fast as they are formed, and then taking the smooth tire thus formed from the rolls while it is still at a red heat and expanding it by blocking to the exact interior diameter required.

Apparatus suitable to be employed to roll the tire smooth, without fins or roughness upon its edges or corners, and also apparatus for cutting off or removing such fins as they form during the process of rolling, I have made the subject of previous applications for Letters Patent, such applications being filed, respectively, on or about April 8, 1884, and October 18, 1883, and as such apparatus does not form part of this invention, I do not deem it necessary to here show or describe the same in detail.

This invention consists in the apparatus I have invented for expanding and blocking the tire to the required size or diameter.

In the accompanying drawings, which form a part of this specification, and in which similar letters indicate like parts, Figure 1 is a central vertical section of a device embodying my invention. Fig. 2 is a plan view. Fig. 3 is a vertical section on line 3 3 of Fig. 2, and Figs. 4, 5, and 6 show slight modifications.

In the drawings, A represents the blocking table or bed upon which the tire B rests, and A' the masonry supporting said table. The table A is divided by radial lines into alternate high segments $a$ and low segments $a'$, preferably three of each.

C and C' are the segmental rings or liners which occupy the space between the tire and the conical wedge or plug D, which operates to force the segments or liners C C' out against the tire and thus expand it. The segments C have inclined ends, and fit as wedges against the inclined ends of the alternate segments C'. The segments C are made deeper or thicker than the segments C', and they are placed over the recesses or low segments $a'$ of the table, so that as the tire is expanded the wedging-segments C may fall or slide down, thus leaving no open space between the ends of such segments C and C'. Outside segments C C' are selected, the circle of whose periphery is of the same diameter as that of the tire to be produced, so that the interior circumference of the tire when expanded will rest against and conform to a true circle of the diameter required.

If the ends of the outside segments C C' were square instead of inclined, they would leave a mark square across the inner surface of the tire where they come together, which would injure and weaken the tire; and as the segments must be forced outward in order to expand the tire, space would necessarily be left between the ends of two contiguous segments, which would occasion a roughness or inequality upon the inner periphery of the tire. By making the ends of the segments wedging or inclined, and by providing recesses in the table under the alternate wedging-segments, so that they can drop down, the slack is taken up and a true and perfect tire may be produced—that is to say, as the segments are expanded radially outward their effective length is slightly increased by the thicker segments sliding down so as to fill the larger circle thus made without leaving a slack or vacant space at their meeting ends. This operation takes place especially when the pressure is first applied and the slack principally taken up.

The table A is provided with a central enlargement, $A^2$, preferably cast integral therewith, having preferably a square hole or opening, $a^2$, therein, through which passes the square shaft or stem $d$ of the conical expander or plug D. The shaft $d$ is threaded at its lower end, and the plug D is drawn down so as to force the segments out by means of a threaded nut or sleeve, $d'$, mounted in the central hub or enlargement, $A^2$, of the table so as to revolve therein, and to which sleeve is keyed a bevel-gear, $d^2$, that meshes with a bevel-gear, $d^3$, on the driving-shaft $d^4$. A jam-nut, $d^5$, secures the sleeve $d'$ in position, and $d^6$ is a brass collar or washer inserted between the gear $d^4$ and the end of the hub or bearing $A^2$. A pair of small reversible engines should be used for operating the apparatus.

The plug or wedge D is provided with a shoulder or collar, $D'$, to serve as a stop to limit the extent to which the plug should be forced down in order to expand the tire to the desired extent. This stop may be adjusted as desired by inserting half ring or collar plates $D^2$ between the shoulder $D'$ and the top or shoulder of the inner segments or liners C C', which bear against the plug D; or other suitable means may be used for adjusting the stop $D'$ or limiting the motion of the plug.

After the tire is expanded to the desired diameter the plug may be forced up by simply reversing the engines, and thus turning the threaded sleeve $d'$ in the opposite direction.

In Fig. 4 I have shown toggle-arms E extending from the head of the shaft to the inner segments C C', as an equivalent for the wedge D, and in Figs. 5 and 6 the wedge is shown polygonal and with flat faces instead of conical, as in Figs. 1 and 2. When a polygonal wedge is employed, it may preferably be square or have four flat faces, and friction-rollers F may be inserted between the flat faces of the wedge D and the similar faces of the opposing segments C C'.

In Fig. 2 one of the segments or liners C is left out at X for the purpose of better showing the inclined ends of the segments C'. In order to prevent any danger of the liners and tire being lifted from the table as the plug D rises on reversing the engines, I provide two or more of the liners C C' with T-shaped radial slots or grooves $g$, in which fit the heads of bolts G, which are firmly screwed into the bed plate or table. The slots or grooves in the liners permit them to slide horizontally while the tire is being expanded, and serve to hold the same down when the plug is being raised or removed.

I claim—

1. In a tire-blocking apparatus, the combination of a table, A, having alternate high and low segments, with a series of blocking segments or liners, C C', having inclined or wedging ends, substantially as specified.

2. The combination of a blocking-table with a series of blocking segments or liners having inclined or wedging ends, and a wedge or plug, D, for expanding the same, substantially as specified.

3. The combination of table A, having central hub or enlargement, A', with segments or liners C C', wedge D, square shaft $d$, having threaded end, sleeve $d'$, gear $d^2$ and $d^3$, and driving-shaft $d^5$, substantially as specified.

4. The combination, with a blocking-table and its segments, of a plug or wedge for expanding the same, threaded shaft $d$, threaded sleeve $d'$, gears $d^2$ and $d^3$, and a stop to limit the movement of said plug or wedge, substantially as specified.

5. The combination of table A with segments C C', plug or wedge D, provided with shoulder or stop $D'$ and adjusting-rings $D^2$, and means for operating said wedge, substantially as specified.

6. The combination, with the table A, provided with headed bolts or pins G, of blocking liners or segments C C', provided with radial slots or grooves for the head of said bolts, substantially as specified.

JAMES MUNTON.

Witnesses:
   H. M. MUNDAY,
   EDMUND ADCOCK.